(12) United States Patent
Lo

(10) Patent No.: US 6,431,460 B1
(45) Date of Patent: Aug. 13, 2002

(54) INCUBATING BOX

(76) Inventor: Cheng-Yu Lo, No. 1-1, Lane 25, Min Chih St., Chung Ho, Taipei Hsien (TW)

( * ) Notice: Subject to any disclaimer, the term of this patent is extended or adjusted under 35 U.S.C. 154(b) by 0 days.

(21) Appl. No.: 10/015,136

(22) Filed: Dec. 10, 2001

(51) Int. Cl.[7] .............................................. A01K 31/20
(52) U.S. Cl. ........................................ 237/15; 119/312
(58) Field of Search .................... 237/14, 15; 119/300, 119/303, 312, 328

(56) References Cited

U.S. PATENT DOCUMENTS

| | | | | |
|---|---|---|---|---|
| 1,149,916 A | * | 8/1915 | Howard | 119/312 |
| 1,346,717 A | * | 7/1920 | Lewis | 119/313 |
| 5,012,763 A | * | 5/1991 | Morrison | 119/302 |
| 5,730,355 A | * | 3/1998 | Lessard et al. | 237/14 |

* cited by examiner

Primary Examiner—Harold Joyce
Assistant Examiner—Derek Boles
(74) Attorney, Agent, or Firm—Pro-Techtor International Services

(57) ABSTRACT

An incubating box includes a container with a flange, an inlet, holding portions, a space, protrusions and supports; a bed which is placed inside the space and supported by the protrusions, a retaining device which is arranged in the recess and supported by the pair of positioning plates, a water absorbing element which is laid down on a top face of the bed to cover the entire surface enclosed by the wall so that water from the water absorbing element is able to be distributed to every part in the bed; and a cap which has a peripheral skirt, a handle, ventilation holes and spacers, wherein the peripheral skirt extends downward to correspond to the flange of the container.

6 Claims, 11 Drawing Sheets

INCUBATING BOX

BACKGROUND OF THE INVENTION

1. Field of the Invention

The present invention relates to an incubating box, and more particularly to an incubating box which is able to position the water absorbing material and also functions as a nursing bed for seed.

2. Description of Related Art

Nowadays, a lot of diseases arise by civilization. In order to cope with the civilization diseases, people start to grow their own food and that is the word "organized food" originated. Merchants try to promote the devices for growing organized food by claiming how many different functions their devices have. Customers after buying the incubating devices often find dissatisfactory. Because the incubating devices ought to bring convenience to the users, the users often find themselves caught in taking care of the incubating devices. Some need to water three to four times a day. Some need to connect to the power or connect to a water source. Another product on the market adopts absorbing cotton to provide the water needed by the seed in the incubating box to avoid repeated watering the incubating box. However, the absorbing cotton is just hung on the incubating box to let the two distal ends of the absorbing cotton to swing freely. Thus, the absorbing cotton is easily attached to sidewalls of the incubating box and loses the function to provide water to the seed. Furthermore, distortion is another factor for the freely-hung absorbing cotton to be abandoned.

To overcome the shortcomings, the present invention intends to provide an improved incubating box to mitigate or obviate the aforementioned problems.

SUMMARY OF THE INVENTION

The primary objective of the invention is to provide an incubating box which provides a retaining device for the absorbing cotton to ensure the absorbing cotton is able to extend directly so as to provide the function of providing water to the seed on the bed in the incubating box.

Other objects, advantages and novel features of the invention will become more apparent from the following detailed description when taken in conjunction with the accompanying drawings.

DETAILED DESCRIPTION OF PREFERRED EMBODIMENT

Figure 1:
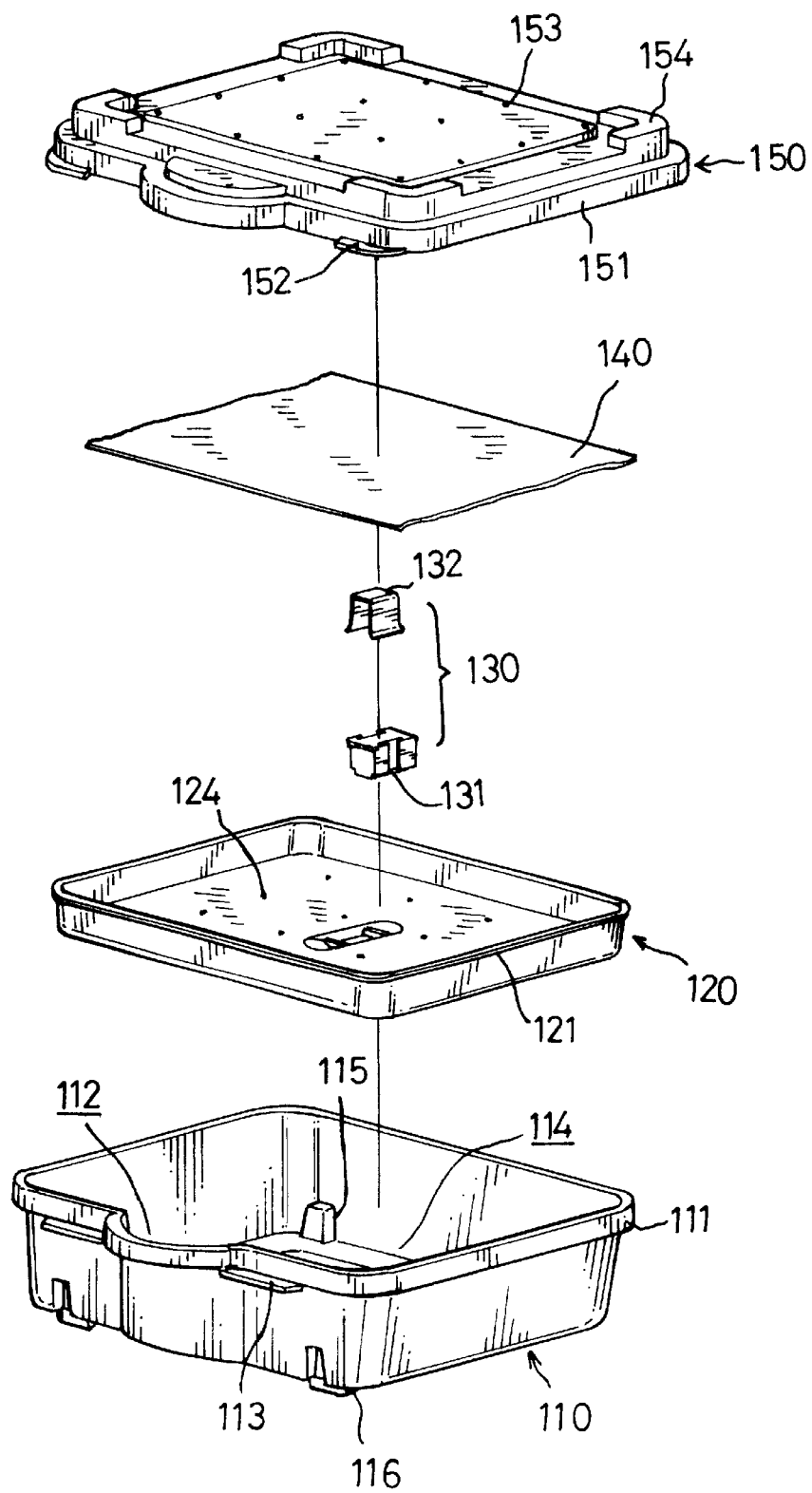
FIG. 1 is an exploded perspective view of the incubating box of the present invention.
Figure 1A:
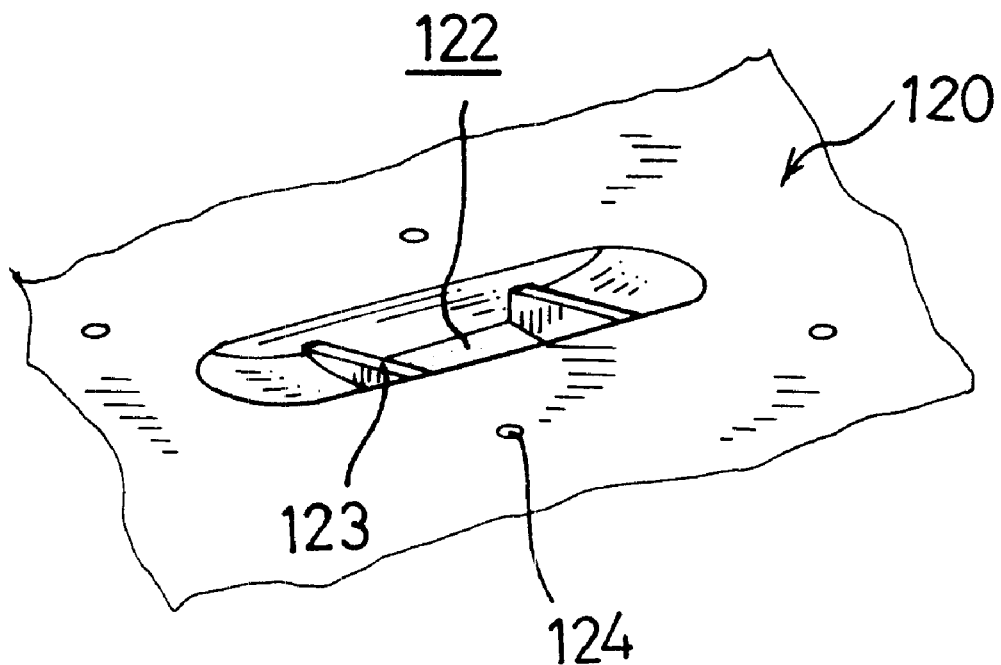
FIG. 1A is an enlargement perspective view showing the structure of the support for the water providing device.
Figure 2A:
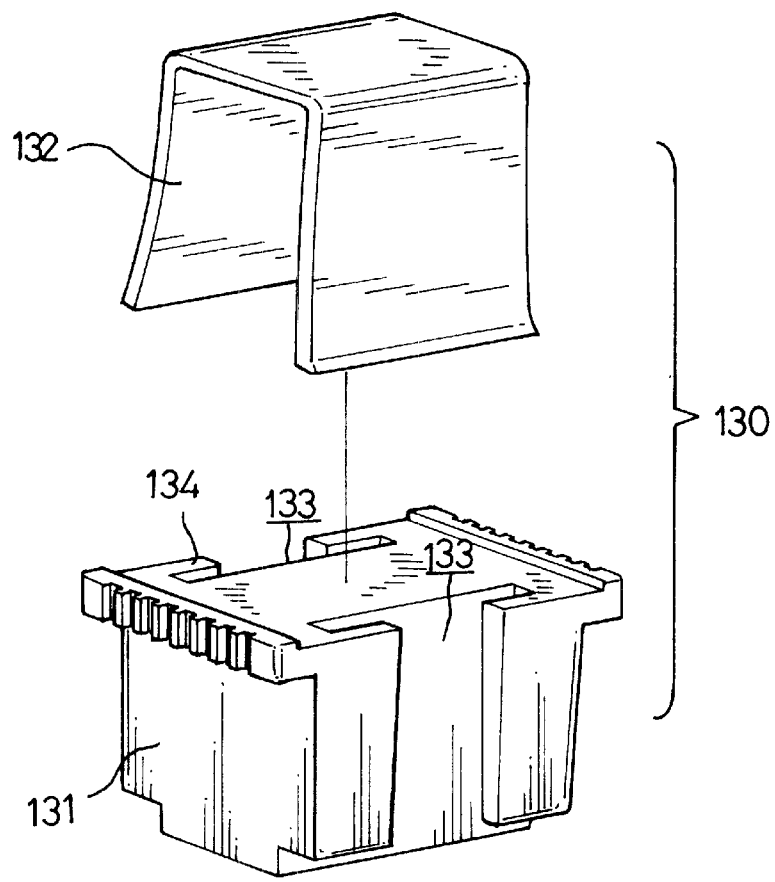
FIG. 2A is an exploded perspective view of the water providing device showing the detailed structure thereof.
Figure 2B:
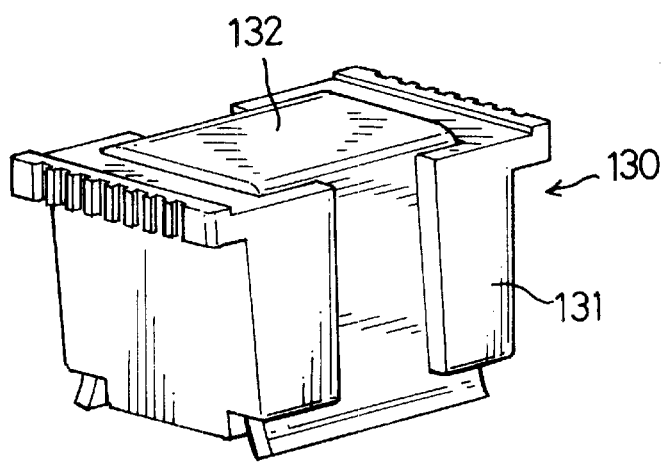
FIG. 2B is a perspective view showing the assembly of the water providing device.

With reference to FIGS. 1, 1A, 2A and 2B, a first preferred embodiment of the incubating box of the present invention is shown. The incubating box includes a container 110, a bed 120, a retaining device 130, a water absorbing element 140 and a cap 150.

The container 110 has a flange 111, an inlet 112, holding portions 113, a space 114, protrusions 115 and supports 116. The flange 111 is formed on a peripheral edge of the open end of the container 110. The inlet 112 is defined in a side face of the container 110 to communicate with the space 114. The holding portions 113 are symmetrically formed below the flange 111 so that the user is able to transport the incubating box of the present invention easily and conveniently. The protrusions 115 are formed on an inner face defining the space 114 and at each corner of the incubating box. The supports 116 are symmetrically formed on a bottom face of the incubating box to support the incubating box on a surface.

The bed 120 is placed inside the space 114 and supported by the protrusions 115. The bed 120 has a wall 121 formed on a periphery of the bed 120 so as to prevent the seed to be planted on the bed 120 from falling into the space 114 of the container 110. At least one (only one is shown in this embodiment) recess 122 is defined in a face of the bed 120 and having a pair of positioning plates 123 arranged in parallel.

The retaining device 130 is arranged in the recess 122 and supported by the pair of positioning plates 123. The retaining device 130 includes a seat 131 and a water absorbing cotton 132. The seat 131 engages with the positioning plates 123 and thus is supported by the positioning plates 123. The seat 131 has two oppositely formed T-shaped notches 133. The water absorbing cotton 132 is U shape. Therefore, the two distal ends of the U-shaped water absorbing cotton 132 are able to extend through a corresponding one of the T shaped notches 133 so that the distal ends of the water absorbing cotton 132 is substantially secured by the seat 131.

The water absorbing element 140 is laid down on a top face of the bed 120 to cover the entire surface enclosed by the wall 121 so that the water from the water absorbing element 140 is able to be distributed to every part in the bed 120.

The cap 150 has a peripheral skirt 151, a handle 152, ventilation holes 153 and spacers 156. The peripheral skirt 151 extends downward to correspond to the flange 111 of the container 110 and has a dimension larger than that of the flange 111 so that the peripheral skirt 151 is able to enclose the flange 111. The handle 152 is pivotally connected to the peripheral skirt 152 and is able to detachably connect to the holding portion 113. Each of the spacers 154 corresponds to one of the supports 116.

When this embodiment of the present invention is assembled, the bed 120 is so configured that the bed 120 is placed inside the container 110 and thus supported by the protrusions 115. The retaining device 130 is arranged in the recess 122 and thus supported by the parallelly arranged positioning plates 123. Thereafter, the water absorbing element 140, preferably a cotton sheet, is placed on top of the bed 120. The cap 150 is mounted on top of the container 110 and the handle 152 pivots to engage with the holding portion 113 to secure the engagement between the container 110 and the cap 150.

Figure 5:
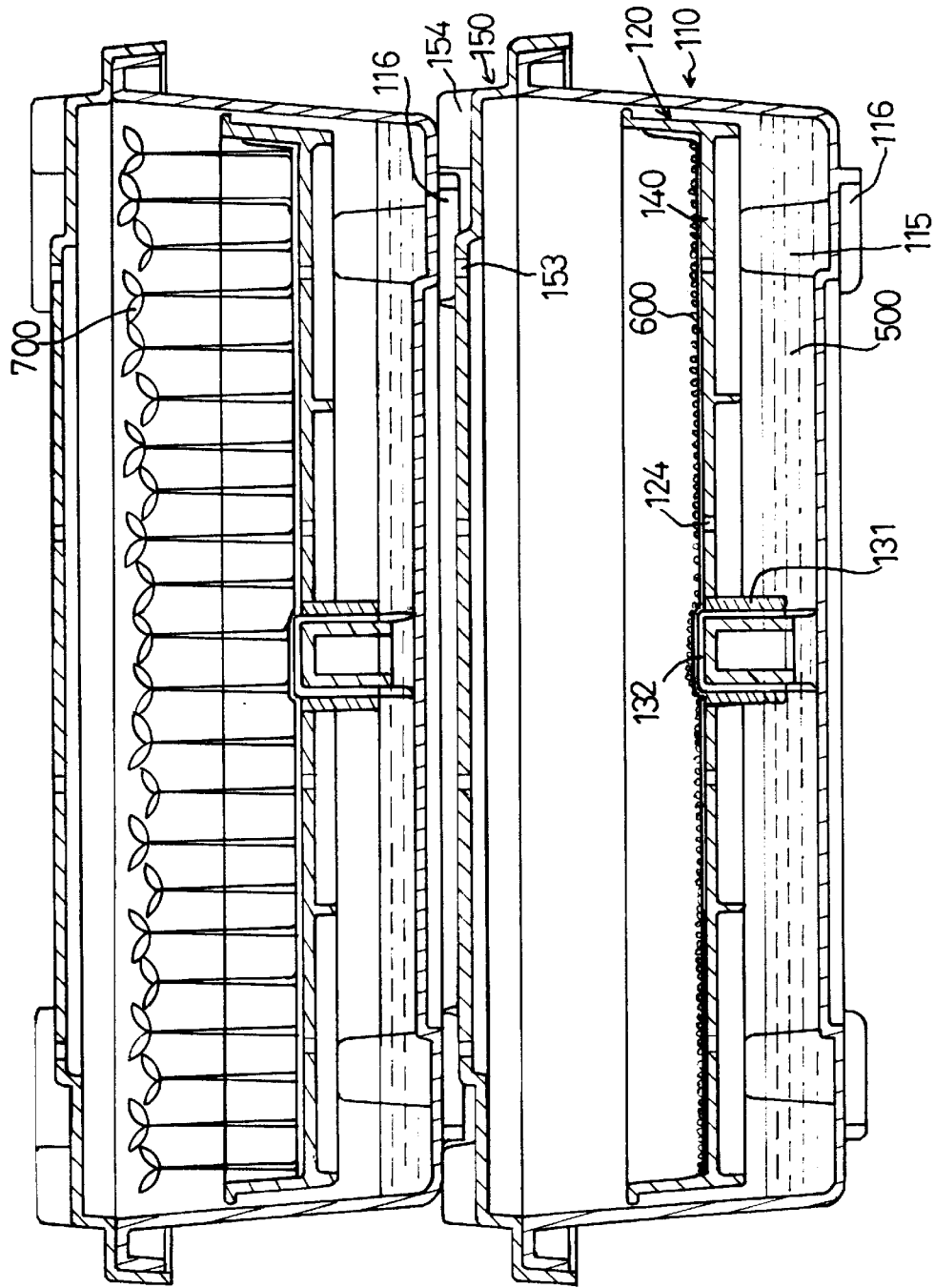
FIG. 5 is a side plan view in section showing the application of the first preferred embodiment of the present invention.
Figure 6:
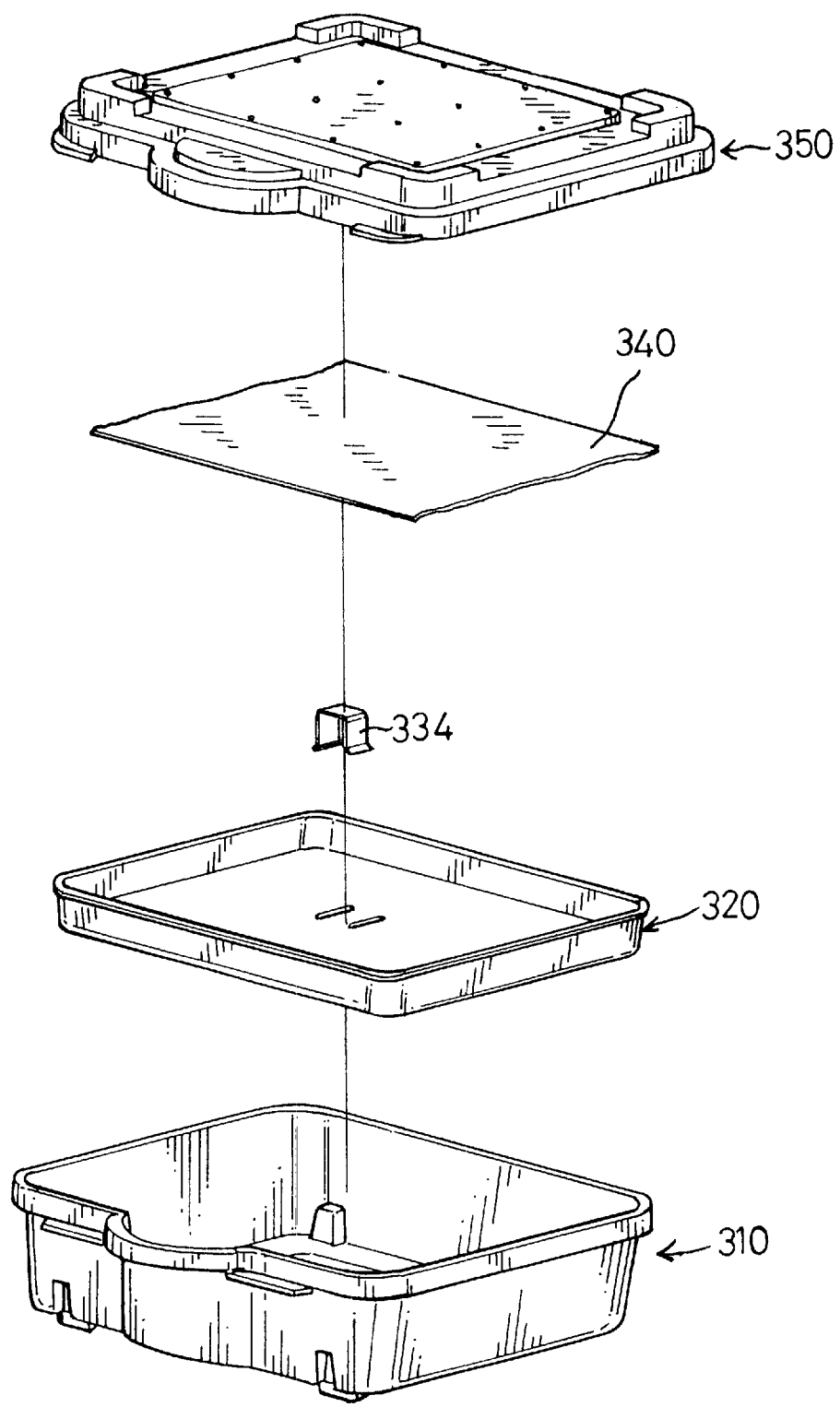
FIG. 6 is an exploded perspective view showing the structure of the third preferred embodiment of the present invention.
Figure 7:
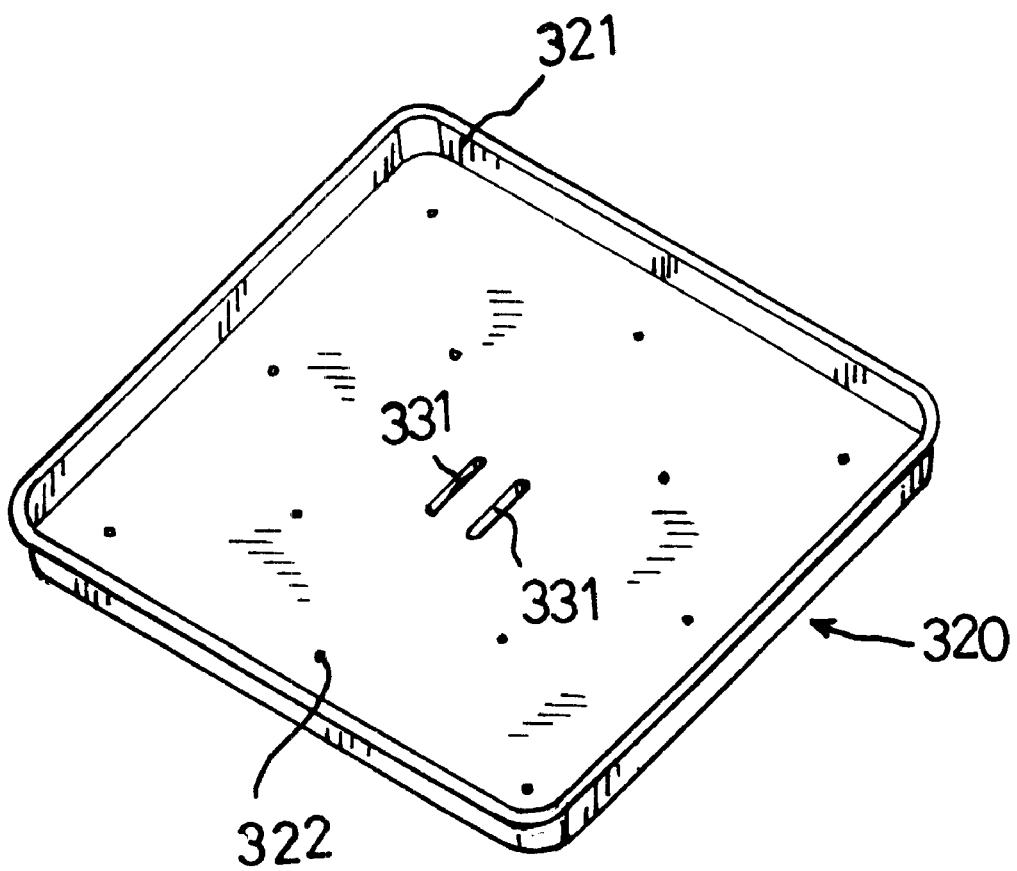
FIG. 7 is a perspective view of the bed in FIG. 6.
Figure 8:
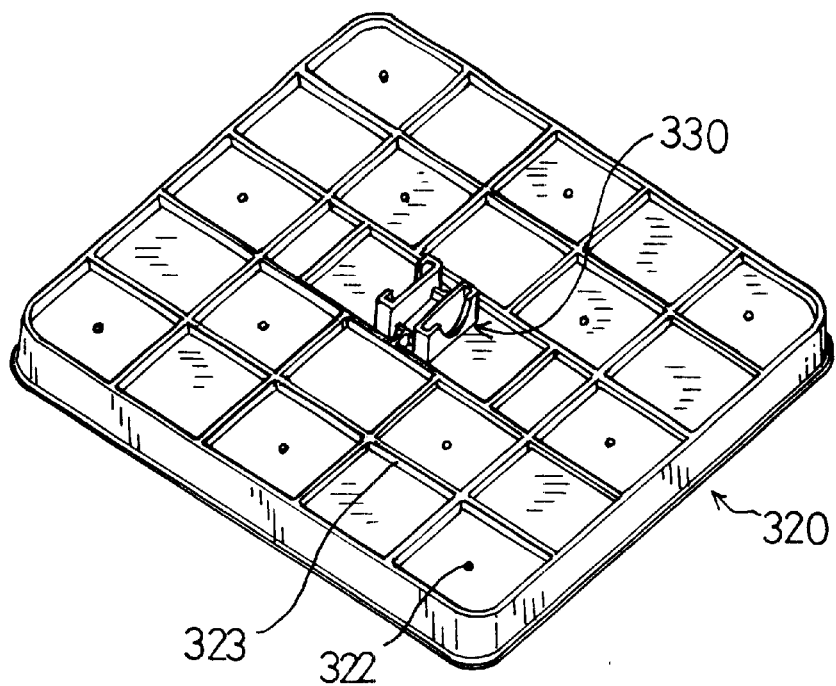
FIG. 8 is a perspective view of the bed in FIG. 6 from an opposite orientation with respect to that of FIG. 7.
Figure 8A:
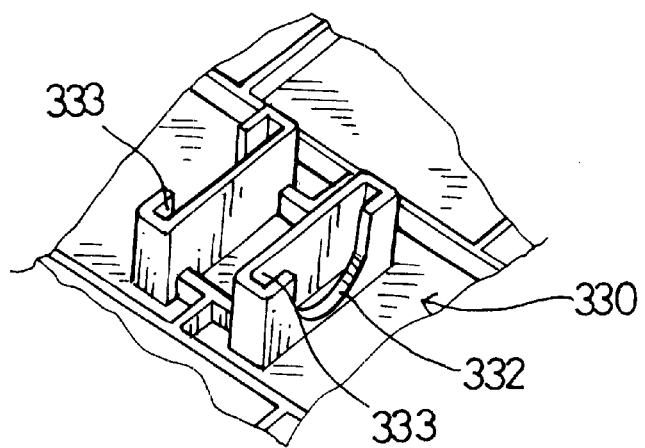
FIG. 8A is an enlargement perspective view of the retainer in FIG. 6.

With reference to FIG. 5, when the incubating box of the present invention is in application, water 500 is added to the space 114 of the container 110 from the inlet 112 for a certain amount to allow the distal ends of the water absorbing cotton 132 to engage with the water surface. Then the water absorbing cotton 132 has a capillary effect to evenly transmit water to the water absorbing element 140, for example, the cotton sheet. The seed is then distributed evenly on the cotton sheet and the ventilation holes 153 of the cap 150 ensure that the seed has enough fresh air to grow. Furthermore, the cotton sheet also functions as a nursing bed for the seedling 700. After securing the engagement between the cap 150 and the container 110, the incubating box is able to be stacked on top of another. That is, the supports 116 of the container 110 of one incubating box engage with the spacers 154 of another incubating box to ensure that there is enough room for air to flow into the ventilation holes 153.

Figure 3:
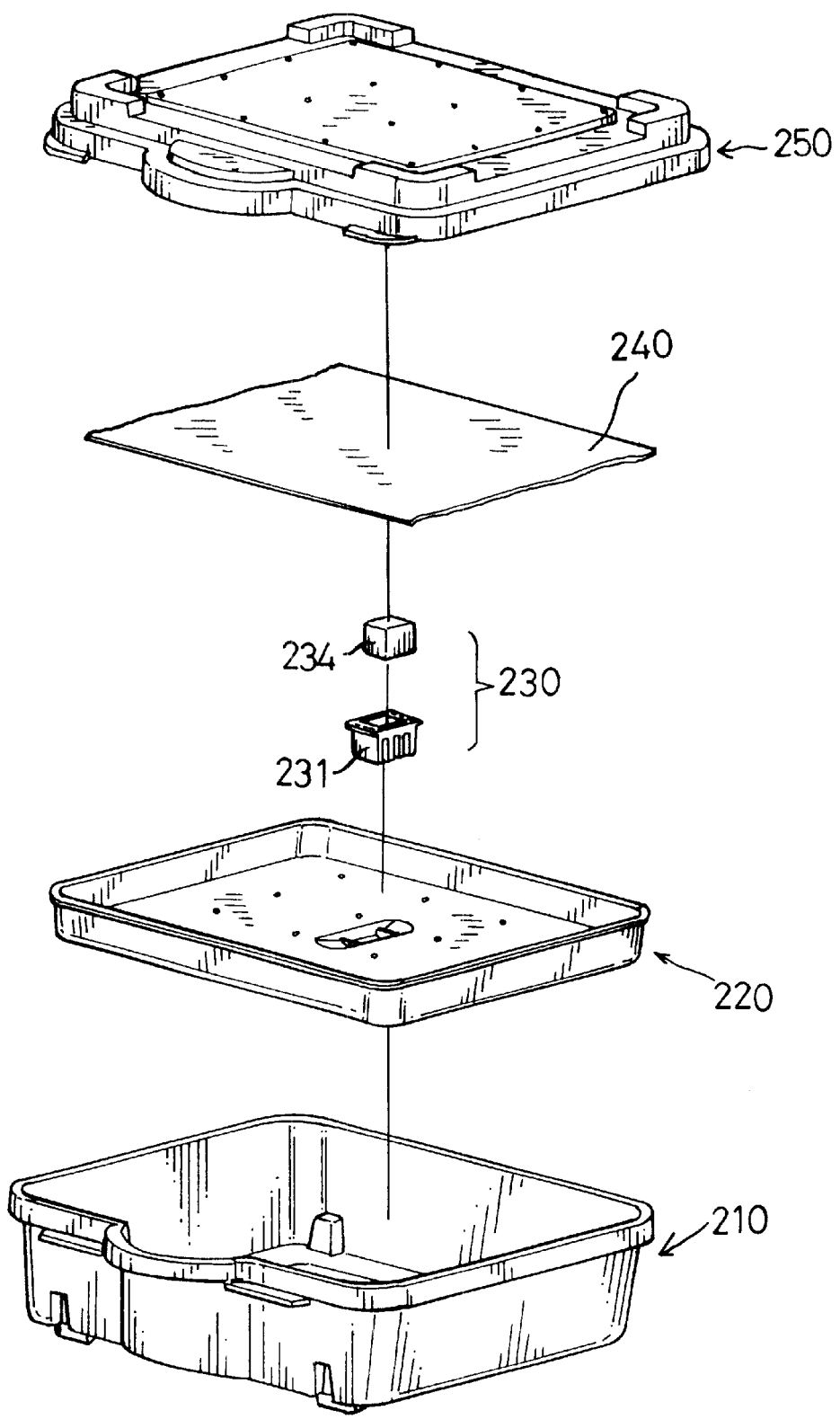
FIG. 3 is an exploded perspective view of the second preferred embodiment of the present invention.
Figure 4A:
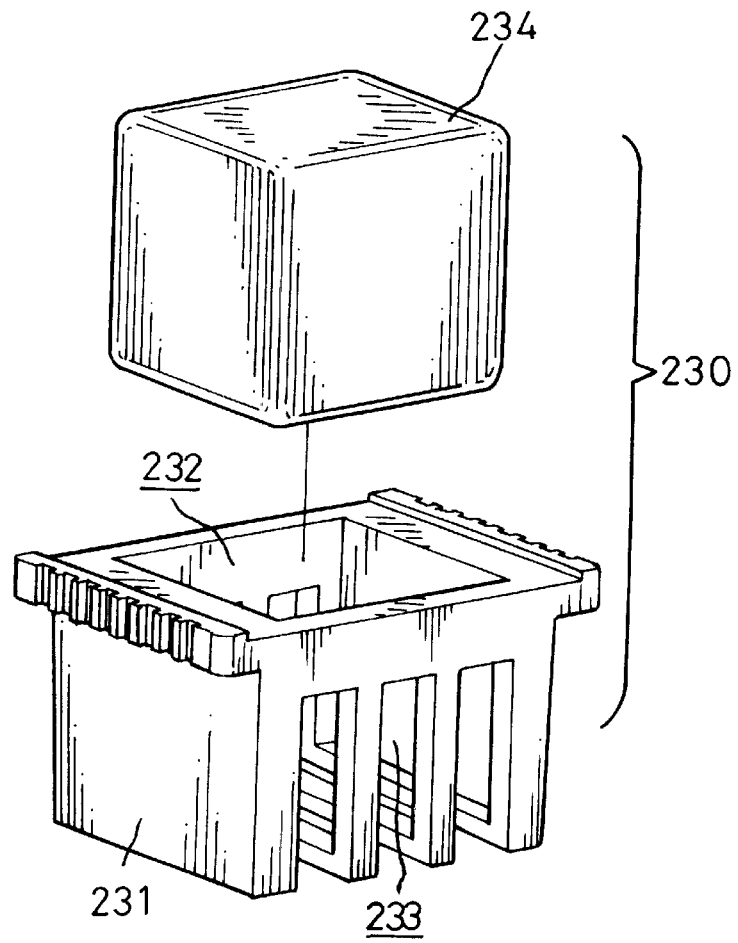
FIG. 4A is an exploded perspective view showing the water providing device in FIG. 3.
Figure 4B:
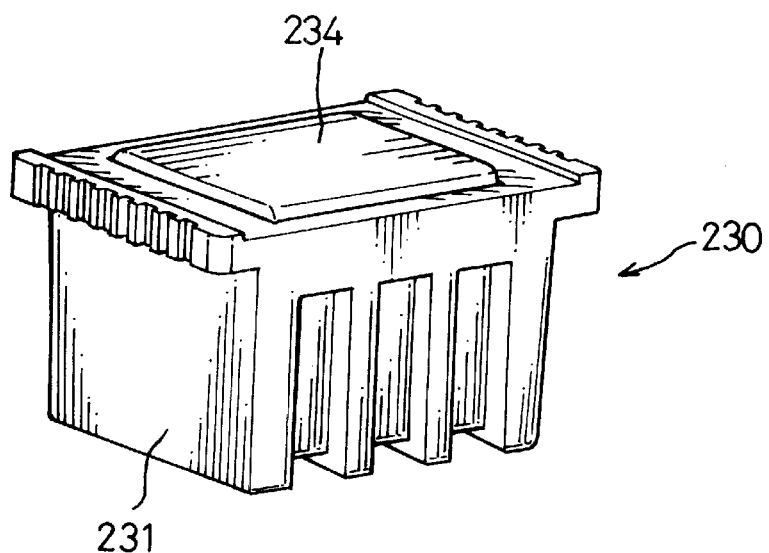
FIG. 4B is a perspective view showing the assembly of the water providing device in FIG. 4A.

With reference to FIGS. 3 and 4, a second preferred embodiment of the incubating box of the present invention is shown. The container 210, the bed 220, the water absorbing element 240 and the cap 250 of the incubating box are the same as that shown in FIG. 1. The difference lies in the retaining device 230. The retaining device 230 includes a seat 231 and a cubic water absorbing cotton 234. The seat 231 has a chamber 232 defined inside the seat 231 and passages 233 defined in a bottom face of the seat 231 to communicate with the chamber 232. The water absorbing cotton 234 has a height greater than a depth of the chamber 232. When the incubating box of the second preferred embodiment of the present invention is in use, the water absorbing cotton 234 is placed in the chamber 232 and thus the water absorbing cotton 234 protrudes out of the chamber 232 so as to engage with the water absorbing element 240, preferably a cotton sheet, to distribute water evenly.

With reference to FIGS. 6, 7, 8 and 8A, a third preferred embodiment of the incubating box of the present invention is shown. The container 310, the water absorbing element 340 and the cap 350 of the incubating box are the same as that shown in FIG. 1. The difference lies in that the bed 320 and the retaining device 330 are integrally formed. The bed 320 is a planner like structure and has a wall 321 formed on a periphery of the bed 320. Multiple holes 322 are defined through the bed 320. Multiple reinforced ribs 323 are formed on a bottom face of the bed 320. The retaining device 330 includes a pair of horizontally defined slits 331 and a pair of extensions 332 integrally extending out from the bottom face of the bed 320. Each of the extensions 332 has a path 333 defined to communicate with one of the pair of slits 331 so that an elongate water absorbing cotton 334 is able to extend through the slits 331 from two distal ends of the elongate water absorbing cotton 334 to be secured in the bed 320.

When the embodiment is in use, the water absorbing element 340 is placed on a top face of the bed so as to engage with the water absorbing cotton 334 and thus water is able to be distributed evenly on the water absorbing element 340.

Figure 9:
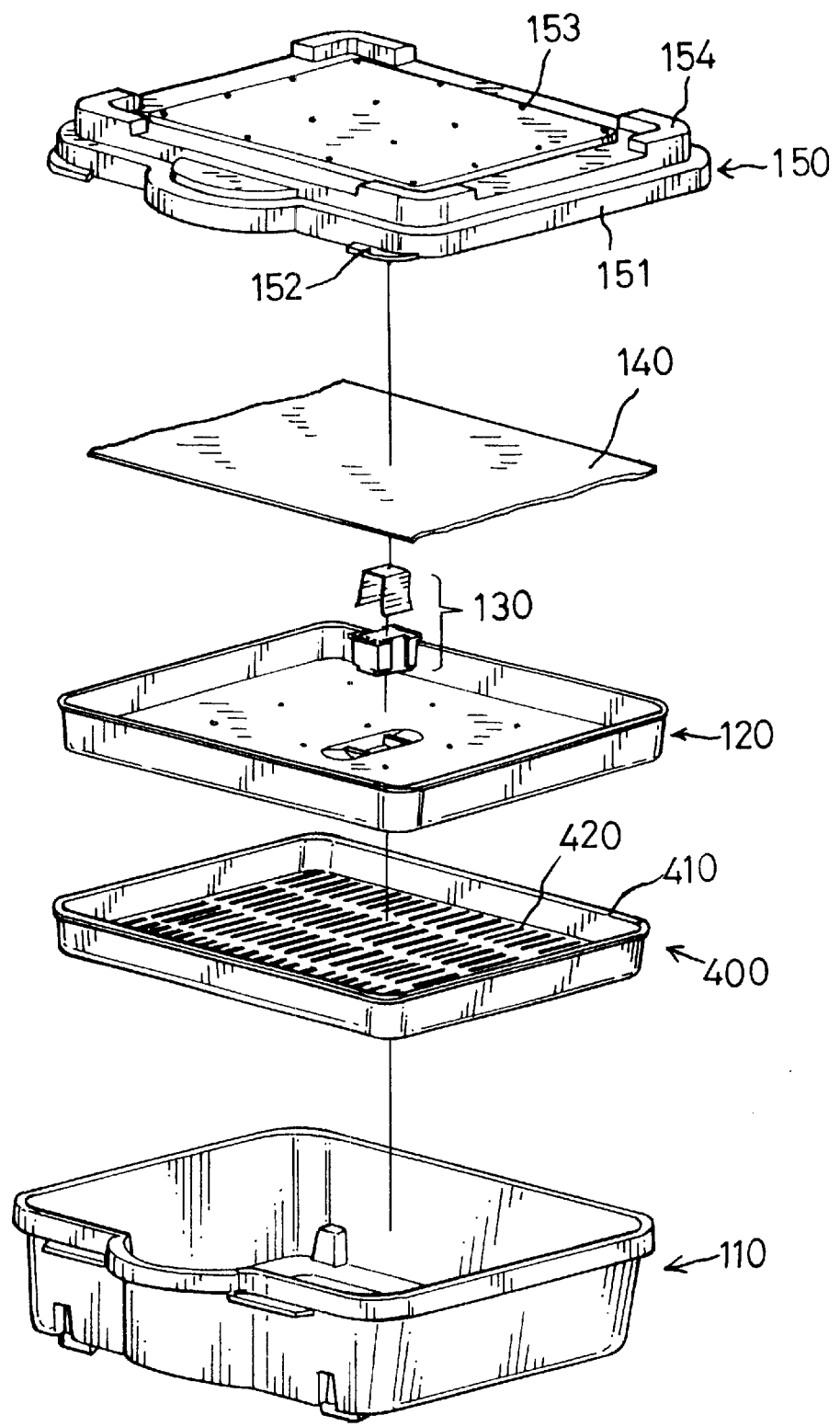
FIG. 9 is an exploded perspective view of the first preferred embodiment with a submerging plate.
Figure 10:
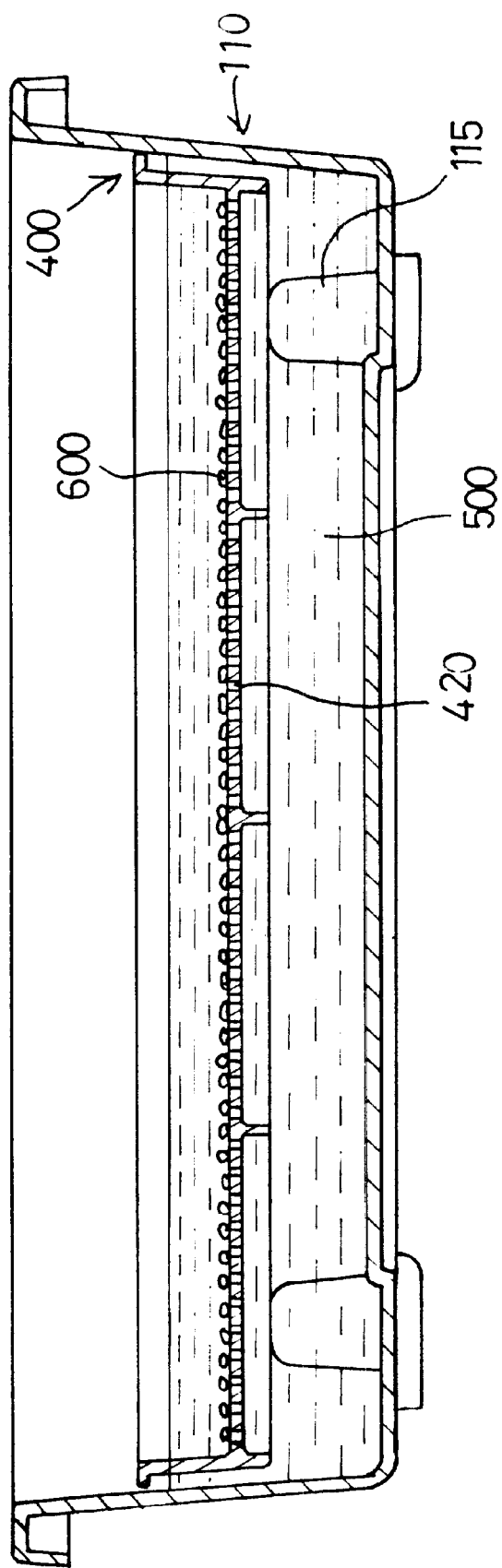
FIG. 10 is a side view showing another application of the first preferred embodiment in FIG. 1.

With reference to FIG. 9, a submerging plate 400 is placed on the protrusions 115 of the container 110 and has a wall 410 on the sides of the plate 400 and grills 420 on the bottom of the plate 400, such that seed 600 is able to be placed on the submerging plate 400 as shown in FIG. 10.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An incubating box comprising:

a container with a flange, an inlet, holding portions, a space, protrusions and supports, wherein the flange is formed on a peripheral edge of the open end of the container, the inlet is defined in a side face of the container to communicate with the space, the holding portions are symmetrically formed below the flange so that the incubating box is easily and conveniently transported, the protrusions are formed on an inner face defining the space and at each corner of the incubating box, the supports are symmetrically formed on a bottom face of the incubating box to support the incubating box on a surface;

a bed which is placed inside the space and supported by the protrusions, wherein the bed has a wall formed on a periphery of the bed so as to prevent the seed to be planted on the bed from falling into the space of the container, at least one recess is defined in a face of the bed and having a pair of positioning plates arranged in parallel;

a retaining device which is arranged in the recess and supported by the pair of positioning plates, wherein the retaining device includes a seat and a water absorbing cotton, wherein the seat engages with the positioning plates and is supported by the positioning plates, the seat has two oppositely formed T-shaped notches, the water absorbing cotton is U shape so that the two distal ends of the U-shaped water absorbing cotton are able to extend through a corresponding one of the T shaped notches and the distal ends of the water absorbing cotton is secured by the seat;

a water absorbing element which is laid down on a top face of the bed to cover the entire surface enclosed by the wall so that water from the water absorbing element is able to be distributed to every part in the bed;

a cap which has a peripheral skirt, a handle, ventilation holes and spacers, wherein the peripheral skirt extends downward to correspond to the flange of the container and has a dimension larger than that of the flange so that the peripheral skirt is able to enclose the flange, the handle is pivotally connected to the peripheral skirt and is able to detachably connect to the holding portion, each of the spacers corresponds to one of the supports.

2. The incubating box as claimed in claim 1 further comprising an submerging plate supported by the protrusions of the container and plated under the bed, wherein the submerging plate has a wall on sides and grills formed on a bottom of the submerging plate to communicate with the space of the container.

3. The incubating box comprising:
  a container with a flange, an inlet, holding portions, a space, protrusions and supports, wherein the flange is formed on a peripheral edge of the open end of the container, the inlet is defined in a side face of the container to communicate with the space, the holding portions are symmetrically formed below the flange so that the incubating box is easily and conveniently transported, the protrusions are formed on an inner face defining the space and at each corner of the incubating box, the supports are symmetrically formed on a bottom face of the incubating box to support the incubating box on a surface;
  a bed which is placed inside the space and supported by the protrusions, wherein the bed has a wall formed on a periphery of the bed so as to prevent the seed to be planted on the bed from falling into the space of the container, at least one recess is defined in a face of the bed and having a pair of positioning plates arranged in parallel;
  a retaining device which is arranged in the recess and supported by the pair of positioning plates, wherein the retaining device includes a seat and a cubic water absorbing cotton, wherein the seat engages with the positioning plates and is supported by the positioning plates, the seat has a chamber for receiving the cubic water absorbing cotton and passages defined in a bottom of the seat to communicate with the chamber;
  a water absorbing element which is laid down on a top face of the bed to cover the entire surface enclosed by the wall so that water from the water absorbing element is able to be distributed to every part in the bed;
  a cap which has a peripheral skirt, a handle, ventilation holes and spacers, wherein the peripheral skirt extends downward to correspond to the flange of the container and has a dimension larger than that of the flange so that the peripheral skirt is able to enclose the flange, the handle is pivotally connected to the peripheral skirt and is able to detachably connect to the holding portion, each of the spacers corresponds to one of the supports.

4. The incubating box as claimed in claim 3 further comprising an submerging plate supported by the protrusions of the container and plated under the bed, wherein the submerging plate has a wall on sides and grills formed on a bottom of the submerging plate to communicate with the space of the container.

5. The incubating box comprising:
  a container with a flange, an inlet, holding portions, a space, protrusions and supports, wherein the flange is formed on a peripheral edge of the open end of the container, the inlet is defined in a side face of the container to communicate with the space, the holding portions are symmetrically formed below the flange so that the incubating box is easily and conveniently transported, the protrusions are formed on an inner face defining the space and at each corner of the incubating box, the supports are symmetrically formed on a bottom face of the incubating box to support the incubating box on a surface;
  a bed which is placed inside the space and supported by the protrusions, wherein the bed has a wall formed on a periphery of the bed so as to prevent the seed to be planted on the bed from falling into the space of the container, at least one recess is defined in a face of the bed and having a pair of positioning plates arranged in parallel;
  a retaining device which is integrally formed with the bed and has reinforced ribs formed on a bottom of the bed and has a pair of horizontally defined slits through the bed and a pair of extensions integrally extending out from the bottom face of the bed, each of the extensions has a path defined to communicate with one of the pair of slits so that an elongate water absorbing cotton is able to extend through the slits from two distal ends of the elongate water absorbing cotton to be secured in the bed;
  a water absorbing element which is laid down on a top face of the bed to cover the entire surface enclosed by the wall so that water from the water absorbing element is able to be distributed to every part in the bed;
  a cap which has a peripheral skirt, a handle, ventilation holes and spacers, wherein the peripheral skirt extends downward to correspond to the flange of the container and has a dimension larger than that of the flange so that the peripheral skirt is able to enclose the flange, the handle is pivotally connected to the peripheral skirt and is able to detachably connect to the holding portion, each of the spacers corresponds to one of the supports.

6. The incubating box as claimed in claim 5 further comprising an submerging plate supported by the protrusions of the container and plated under the bed, wherein the submerging plate has a wall on sides and grills formed on a bottom of the submerging plate to communicate with the space of the container.

* * * * *